V. NIVOIS.
EYEGLASS CASE.
APPLICATION FILED JUNE 21, 1917.
1,248,893.
Patented Dec. 4, 1917.
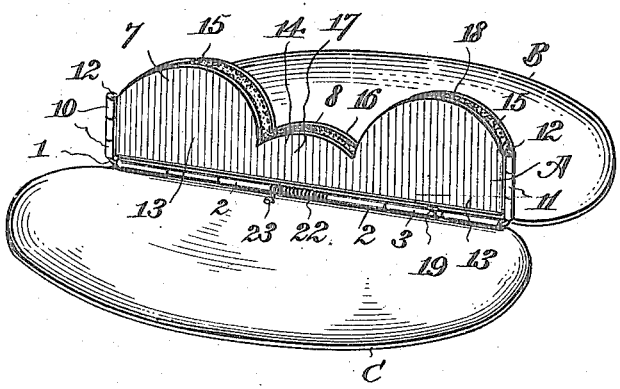
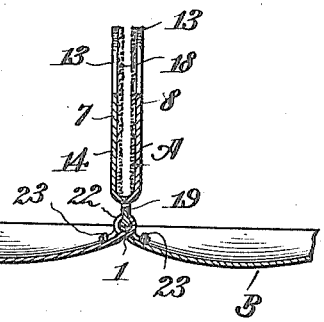
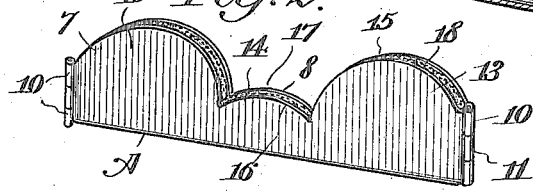
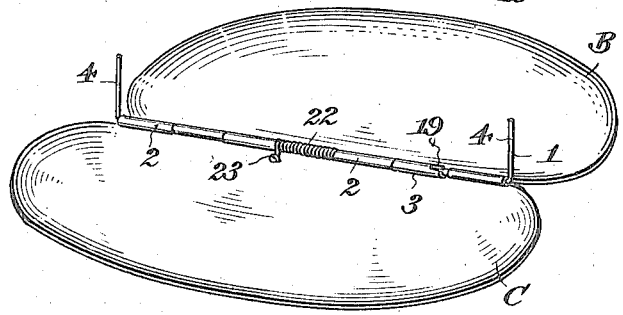
Inventor,
Victor Nivois.
By his Attorneys,
Meyers, Cushman & Rea.

UNITED STATES PATENT OFFICE.

VICTOR NIVOIS, OF BROOKLYN, NEW YORK.

EYEGLASS-CASE.

1,248,893.

Specification of Letters Patent.  Patented Dec. 4, 1917.

Application filed June 21, 1917. Serial No. 176,219.

*To all whom it may concern:*

Be it known that I, VICTOR NIVOIS, a citizen of France, residing at Brooklyn, in the county of Kings and State of New York, have invented new and useful Improvements in Eyeglass-Cases, of which the following is a specification.

This invention relates to cases for receiving and protecting eyeglasses, spectacles and other fragile or easily injured articles.

In the present instance it is my purpose to provide a case of this character wherein an article, such as a pair of eyeglasses may be firmly and movably supported or held and at the same time cushioned and protected against injury or breakage due to shocks, jars and pressure, the means for holding the article being attached to or connected with an exterior casing which affords additional protection to the contents, and at the same time enables the entire case to be easily and conveniently carried in the pocket.

A further object of my invention is the provision of a case embracing a holder member interposed between and connected with an exterior casing comprising a pair of covers, the cover members and the holder being so correlated and arranged that when the case is opened the cover members may lie extended in substantially the same plane, while the holder will project at substantially right angles to the cover members thereby presenting the contained article, such as a pair of eyeglasses, in such position as to enable it to be instantly and easily removed from the holder.

Another purpose of the invention is to provide a case for eyeglasses and the like wherein the holder member is so constructed as to completely embrace and protect the lenses while exposing the bridge or nose-piece of the glasses so that such bridge piece may be grasped to remove the glasses from the holder. Furthermore, I propose to so construct the holder member of my improved case, that when the glasses are inserted therein they will be firmly clamped and prevented from wabbling or working sidewise or laterally therein, thus obviating the liability of the glasses accidentally falling from the holder.

I also propose to provide an eyeglass case which when closed will have but relatively little thickness, so that it may be conveniently carried about in the pocket.

Another object of the invention is the provision that the case will embody the desired features of simplicity and efficiency, coupled with economy in the cost of production and marketing.

With the above recited objects and others of a similar nature in view, my invention consists in the construction, combination and arrangement of parts set forth in and falling within the scope of the appended claims.

In the accompanying drawings:

Figure 1 is a perspective view of an eyeglass case embodying my invention and showing the same in open position.

Fig. 2 is a view similar to Fig. 1 but showing the holder in position ready to be connected with the cover sections of the case.

Fig. 3 is a cross sectional view taken through the case.

Fig. 4 is a side elevation showing a portion of a pintle which may be employed in connection with the invention.

Fig. 5 is a plan view partly in section of the middle portion of the case at the hinge connection.

Referring now to the accompanying drawings in detail, it will be noted that the case in the present instance is composed of an eyeglass holder which is indicated as an entirety by the letter A, and a pair of hinged cover sections shown at B and C.

I wish it to be understood that both the holder and the cover members may be made of any suitable material, such as metal, leather, fiber, compositions, or the like, and furthermore, that while I will hereinafter describe a preferred manner of mounting the holder between and in coöperative relation to the cover sections, it will be understood that the invention is not limited in this respect, as any suitable mechanical arrangement may be resorted to for the purpose mentioned.

In the form of the invention illustrated in the drawing, the cover sections B and C are preferably slightly dished and are shaped, or of the contour usually adopted in the manufacture of eyeglass cases. The cover sections B and C are hingedly connected at their adjacent longitudinal edges, the hinge in the present instance comprising a pintle 1, which passes through alining sleeves 2 and 3 formed on the cover sections B and C respectively, the sleeves of one cover section alternating with the sleeves of the other cover section, as will be readily understood by reference to Figs. 1 and 2. The pintle, is preferably made much longer than the length of the cover sections, so that when passed through the alining hinge sleeves, the ends of the pintle may be bent upward or at right angles to the intermediate portion thereof, so as to form holder-receiving and carrying posts 4—4, the intermediate portion of the pintle of course being threaded in the sleeves. The eyeglass holder A is in the present instance shown as formed of a pair of spaced plates 7 and 8, which abut at their bottom edges. The ends of the plate 7 are provided with short sleeves 10, which lie in alinement with similar sleeves 10 on the ends of the companion plate 8, and through these sleeves the pintle posts 4—4 are adapted to pass or to be threaded, as shown in Fig. 1, for the purpose of uniting the two sections or plates of the holder and connecting such holder to the cover sections of the case. In actual practice the plates are put together with the sleeves in alinement as shown in Fig. 2, and the sleeves at both ends of the holder are then slipped onto the pintle posts 4. Any suitable means may be used for preventing the displacement of the holder from the pintle posts, such as by slightly bending or riveting the end of each extension, or by indenting or pinching one of the sleeves at one end, as shown at 12 in Fig. 1. In order to accommodate such a peculiarly shaped article as a pair of eyeglasses and to permit the ready insertion and removal of the same from the holder A, I shape and construct the plates of the holder as shown herein, and in this connection it will be apparent that as the plates composing the holder are duplicates, a description of one will suffice for both. Each plate is stamped or cut to provide a pair of relatively wide and deep end sections 13 and a relatively narrow and shallow intermediate section 14, the upper edges of the end sections being rounded as at 15, so as to approximately conform or correspond to the curvature of the lenses, while the intermediate section 14 is also rounded, as shown at 16 to somewhat conform to the general shape or contour of the bridge or nosepiece of the glass, the central or intermediate gap or space 17 formed above the intermediate section of the plate and between the confronting rounded edges of the end sections 13 will accommodate the bow or bridge piece of the eyeglass, and at the same time will permit the exposure thereof so that when the case is opened and the glasses are held therein, such glasses may be instantly grasped by the nose or bridge piece and lifted from the holder. Conversely of course the glasses may be quickly and properly replaced in the holder, by simply grasping the same at the nosepiece and inserting them in such holder that the lenses will lie between and be embraced by the opposing end sections of the plates constituting such holder.

In order to further protect the glasses while in the holder and to obviate the liability of the lenses being broken by shocks, jars and pressure, I prefer to line the inner face of each plate of the holder with a sheet of a relatively soft material, such as felt, plush, chamois skin or the like, as indicated at 18, these lining sheets of the plates conforming to the contour or shape of the latter and constituting means for cushioning the lenses. Of course these protective linings or sheets may be fastened to the plates of the holder in any suitable manner, such as by pasting or the like.

I also prefer to mount the holder within and relative to the cover sections so that when the case is opened, the sections will lie spread out or flat in substantially the same plane so that the case may be placed on a support, such as a table or the like, at which time the holder will present itself in substantially upright position, as is illustrated in Fig. 1. To this end I prefer to provide the pintle 1 at a suitable point with a lug 19 preferably integral with the pintle, and I also prefer to cut away a pair of the adjacent sleeves 2 and 3 so that each cover section presents an abutting part 20 which lies beyond the axis of the pintle with respect to the cover section of which it forms a part. Thus it will be noted that when the cover sections swing apart in the opening of the case, the parts 20 will move toward each other, and as each of these parts 20 is formed with a shoulder 21, these shoulders will approach each other and grip the lug 19 therebetween, thus the pintle will be held so that the posts 4 thereof occupy an upright position relative to the cover sections, and consequently the holder will extend upright.

I also prefer to provide means normally tending to bring or throw the cover sections to closed position so that the instant the cover sections are released after pressure has been exerted to open the same, they will snap to closed position.

For this purpose any suitable arrangement may be employed, such as the coil torsion spring 22, the terminals or ends of which are hooked or otherwise connected with the cover sections, as shown at 23, the spring being so arranged that the cover sections must be opened against the action of the spring, and thus when the pressure on the cover sections is released, this spring will exert its force to bring the sections to closed holder-embracing position. Thus in addition to insuring that the case will normally be closed thus protecting the glasses, if the latter are positioned therein, I avoid the necessity of employing catches or other fastening devices which have a tendency to catch in the clothing or walls of the pocket, and which must also be manipulated in the opening and closing of the case.

From the above description, taken in connection with the accompanying drawings, the construction and operation of my improved case will be readily apparent.

It will of course be understood that the embodiment of the invention described herein is only one of the many forms it may take, and therefore, I wish it to be understood that I do not limit myself to all the precise details of construction herein set forth by way of illustration, as modification and variation may be made without departing from the spirit of the invention or exceeding the scope of the appended claims.

What I claim is:

1. A case of the class described including a pair of cover members, and an eyeglass holder supported therebetween and adapted to assume an upright position relative to the cover members when the latter are opened, said holder including a pair of end sections adapted to embrace the lenses of an eyeglass and spaced apart to expose the bridgepiece of the eyeglass when the latter is positioned within the holder.

2. A case of the class described, including a pair of cover sections, and an eyeglass holder therebetween comprising companion plates each provided with a cushion facing adapted to cushion the lenses of the eyeglass having relatively wide and deep end sections adapted to embrace the lenses of the eyeglass, and an intermediate narrow section of the eyeglass forming a space or gap for the accommodation of the bridge-piece of the eyeglass.

3. A case of the class described, including a pair of hinged cover sections and a holder positioned therebetween and connected therewith, said holder including companion members having end portions adapted to embrace the lenses of the eyeglass and having an intermediate gap between said end portions adapted to accommodate the bridgepiece of the eyeglass.

4. A case of the class described, including a pair of hinged cover sections and a holder positioned therebetween and connected therewith, said holder including companion members having end portions adapted to embrace the lenses of the eyeglass and having an intermediate gap between said end portions adapted to accommodate the bridge-piece of the eyeglass, and means for maintaining said holder in an upright position relative to the cover members when the latter are opened.

5. A case of the class described including a pair of hinged, dished cover members and an eyeglass holder located therebetween and connected therewith, said holder including a lens-supporting section for supporting a lens of an eyeglass within the holder, the bridgepiece of the eyeglass remaining exposed adjacent the lens-holding section.

6. In an eyeglass case a holder comprising a pair of separate plates arranged in spaced relation, said plates having relatively wide and deep lens-embracing portions, and a relatively shallow intermediate portion forming a gap in conjunction with the lens-embracing portions at which gap the bridgepiece of the eyeglass will be exposed.

7. In an eyeglass case a holder comprising a pair of separate plates arranged in spaced relation, said plates having relatively wide and deep lens-embracing portions, a relatively shallow intermediate portion forming a gap in conjunction with the lens-embracing portions at which gap the bridge-piece of the eyeglass will be exposed, said plates having alining sleeves formed at opposite ends and a pintle member having posts at its opposite ends passing through such sleeves and connecting said sleeves.

In testimony whereof I have hereunto set my hand.

VICTOR NIVOIS.